(12) United States Patent
Patwardhan

(10) Patent No.: US 6,496,393 B1
(45) Date of Patent: Dec. 17, 2002

(54) INTEGRATED TRACTION INVERTER MODULE AND BI-DIRECTIONAL DC/DC CONVERTER

(75) Inventor: Ajay V Patwardhan, Inkster, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 09/683,172

(22) Filed: Nov. 28, 2001

(51) Int. Cl.$^7$ .......................... H02M 7/00; H02M 7/538
(52) U.S. Cl. ........................................ 363/70; 363/132
(58) Field of Search .......................... 363/132, 70, 137, 363/133, 134, 136

(56) References Cited

U.S. PATENT DOCUMENTS

| | | | |
|---|---|---|---|
| 4,920,475 A | * 4/1990 | Rippel | 363/132 |
| 5,214,358 A | 5/1993 | Marshall | 318/139 |
| 5,513,718 A | 5/1996 | Suzuki et al. | 180/65.2 |
| 5,513,719 A | 5/1996 | Moroto et al. | 180/65.4 |
| 5,589,743 A | 12/1996 | King | 318/139 |
| 5,886,890 A | 3/1999 | Ishida et al. | 363/71 |
| 5,924,505 A | * 7/1999 | Theurillat et al. | 180/65.4 |
| 5,936,854 A | 8/1999 | Uesugi et al. | 363/44 |
| 6,023,137 A | * 2/2000 | Kumar et al. | 318/254 |
| 6,064,178 A | * 5/2000 | Miller | 320/117 |
| 6,108,215 A | 8/2000 | Kates et al. | 363/17 |

* cited by examiner

*Primary Examiner*—Bao Q. Vu
(74) *Attorney, Agent, or Firm*—Seed IP Law Group PLLC

(57) ABSTRACT

Integrated power systems and methods for use in an electric vehicle having a fuel cell and an electric motor, the integrated power systems and methods including a common casting, a traction inverter module operable for converting DC current generated by the fuel cell into AC current capable of powering the electric motor, and a DC/DC converter operable for stepping-down the voltage of the fuel cell. The traction inverter module and the DC/DC converter are disposed within the common casting.

12 Claims, 4 Drawing Sheets

INTEGRATED TRACTION INVERTER MODULE AND BI-DIRECTIONAL DC/DC CONVERTER

BACKGROUND OF THE INVENTION

The present invention relates generally to integrated power systems and methods for use in a variety of applications, such as in battery-powered vehicles, fuel cell vehicles, and hybrid electric vehicles. More specifically, the present invention relates to integrated power systems and methods including a traction inverter module and a bi-directional DC/DC converter combined into a single assembly.

Traditionally, the powertrain and power conversion systems of battery-powered vehicles, fuel cell vehicles, and hybrid electric vehicles (HEVs) (collectively referred to as "electric vehicles") have included a plurality of separate, discrete components and assemblies. Among these components and assemblies are the traction inverter module (TIM) and the bi-directional DC/DC converter (DC/DC converter). The TIM, also called the electric power inverter, converts the raw DC current generated by a battery or a fuel cell into an AC current capable of powering an electric motor, such as a field-oriented induction motor. This power is converted for driving and controlling the motor, i.e. for generating torque. The motor, in combination with a transaxle, converts the electrical energy into mechanical energy which turns the wheels of the electric vehicle. The DC/DC converter is the electric vehicle equivalent of the alternator of an internal combustion engine-powered vehicle. The DC/DC converter uses pulse-width modulation (PWM) to step the voltage associated with an electric vehicle's high-voltage battery pack or fuel cell down to that which an alternator would usually generate (13.5 to 14V). The DC/DC converter is typically used to charge a 12V accessory/auxiliary battery, which is typically separated from the potentially dangerous high-voltage battery pack or fuel cell. The DC/DC converter may also be used to transfer power from the accessory/auxiliary battery to the high-voltage battery pack or fuel cell to, for example, start the electric vehicle.

Traditionally, the TIM and the DC/DC converter have been enclosed within separate, discrete castings, one in the front of the vehicle and one in the rear. The TIM and the DC/DC converter have utilized separate busbars to route incoming power to each, separate coldplates to cool the components of each, and separate connectors to connect each with other components and assemblies of the electric vehicle. This has increased the overall volume, weight, and complexity of the powertrain and power conversion systems. Thus, what is needed are integrated power systems and methods which combine the TIM and the DC/DC converter into a single assembly, reducing their overall volume, weight, and complexity.

SUMMARY OF THE INVENTION

The present invention provides integrated power systems and methods including a traction inverter module (TIM) and a bidirectional DC/DC converter (DC/DC converter).

In one embodiment, an integrated power system for use in an electric vehicle having a fuel cell and an electric motor includes a common casting, a traction inverter module operable for converting DC current generated by the fuel cell into AC current capable of powering the electric motor, and a DC/DC converter operable for stepping-down the voltage of the fuel cell. The traction inverter module and the DC/DC converter are disposed within the common casting.

In another embodiment, an electric vehicle having a fuel cell and an electric motor includes an integrated power system. The integrated power system includes a common casting, a traction inverter module operable for converting DC current generated by the fuel cell into AC current capable of powering the electric motor, and a DC/DC converter operable for stepping-down the voltage of the fuel cell. The traction inverter module and the DC/DC converter are disposed within the common casting.

In a further embodiment, an integrated power method for use in an electric vehicle having a fuel cell and an electric motor includes providing a common casting, providing a traction inverter module operable for converting DC current generated by the fuel cell into AC current capable of powering the electric motor, and providing a DC/DC converter operable for stepping-down the voltage of the fuel cell. The method also includes disposing the traction inverter module and the DC/DC converter within the common casting.

Advantageously, the integrated power systems and methods of the present invention combine the TIM and the DC/DC converter into a single assembly, reducing their overall volume, weight, and complexity.

BRIEF DESCRIPTIONS OF THE DRAWINGS

DETAILED DESCRIPTION

As described above, the powertrain and power conversion systems of battery-powered vehicles, fuel cell vehicles, and hybrid electric vehicles (HEVs) (collectively referred to as "electric vehicles") have typically included a plurality of separate, discrete components and assemblies. Among these components and assemblies are the traction inverter module (TIM) and the bidirectional DC/DC converter (DC/DC converter). The TIM, also called the electric power inverter, converts the raw DC current generated by a battery or a fuel cell into an AC current capable of powering an electric motor, such as a field-oriented induction motor. This power is converted for driving and controlling the motor, i.e. for generating torque. The motor, in combination with a transaxle, converts the electrical energy into mechanical energy which turns the wheels of the electric vehicle. The DC/DC converter is the electric vehicle equivalent of the alternator of an internal combustion engine-powered vehicle. The DC/DC converter uses pulse-width modulation (PWM) to step the voltage associated with an electric vehicle's high-voltage battery pack or fuel cell down to that which an alternator would usually generate (13.5 to 14V). The DC/DC converter is typically used to charge a 12V accessory/auxiliary battery, which is typically separated from the potentially dangerous high-voltage battery pack or fuel cell. The DC/DC converter may also be used to transfer power from the accessory/auxiliary battery to the high-voltage battery pack or fuel cell to, for example, start the electric vehicle.

Traditionally, the TIM and the DC/DC converter have been enclosed within separate, discrete castings, one in the front of the vehicle and one in the rear. The TIM and the DC/DC converter have utilized separate busbars to route incoming power to each, separate coldplates to cool the components of each, and separate connectors to connect each with other components and assemblies of the electric vehicle. This has increased the overall volume, weight, and complexity of the powertrain and power conversion systems. Thus, what is needed are integrated. power systems (IPSs) which combine the TIM and the DC/DC converter into a single assembly, reducing their overall volume, weight, and complexity.

Figure 1:
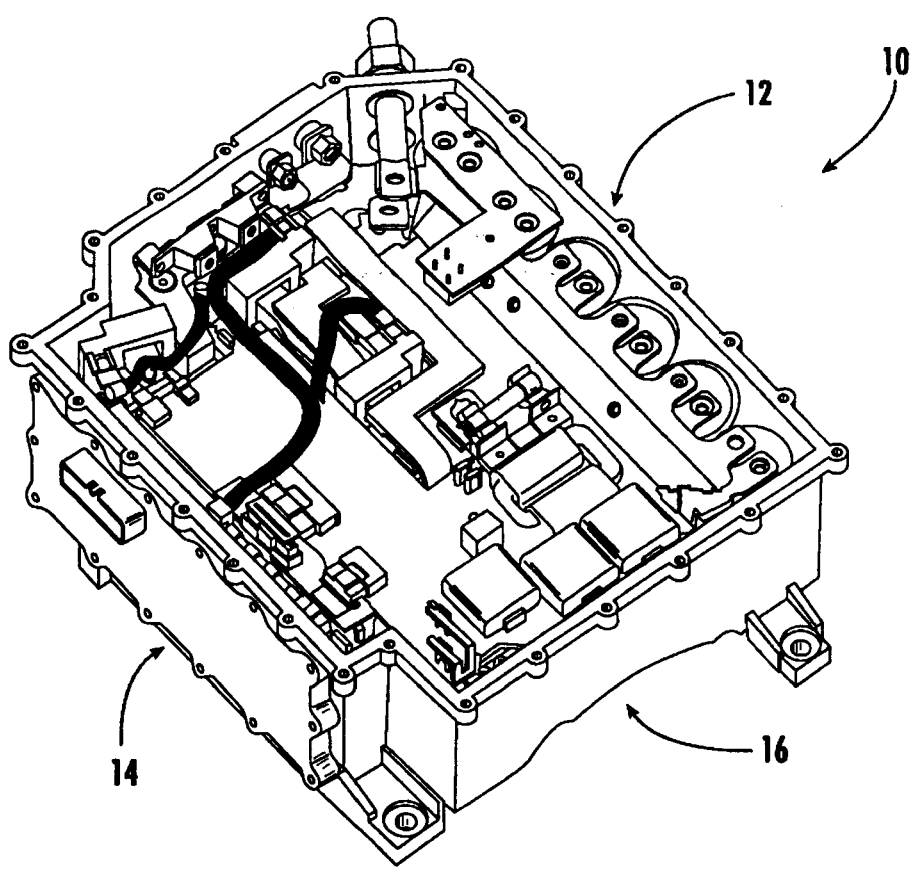
FIG. 1 is a perspective view of one embodiment of an integrated power system for use in an electric vehicle, highlighting the relative positions of the traction inverter module (TIM) and the bi-directional DC/DC converter (DC/DC converter)

Referring to FIG. 1, in one embodiment, the integrated power system 10 of the present invention includes the TIM 12 and the DC/DC converter 14 enclosed within a common casting 16. The common casting 16 may incorporate a common coldplate for cooling the insulated gate bipolar transistors (IGBTs), the FETs, and the magnetics of the assemblies. This common coldplate configuration may allow a common coldplate inlet and a common coldplate outlet to be utilized. A common coolant circuit may be used to circulate coolant from the coldplate inlet-to the coldplate outlet.

Figure 2:
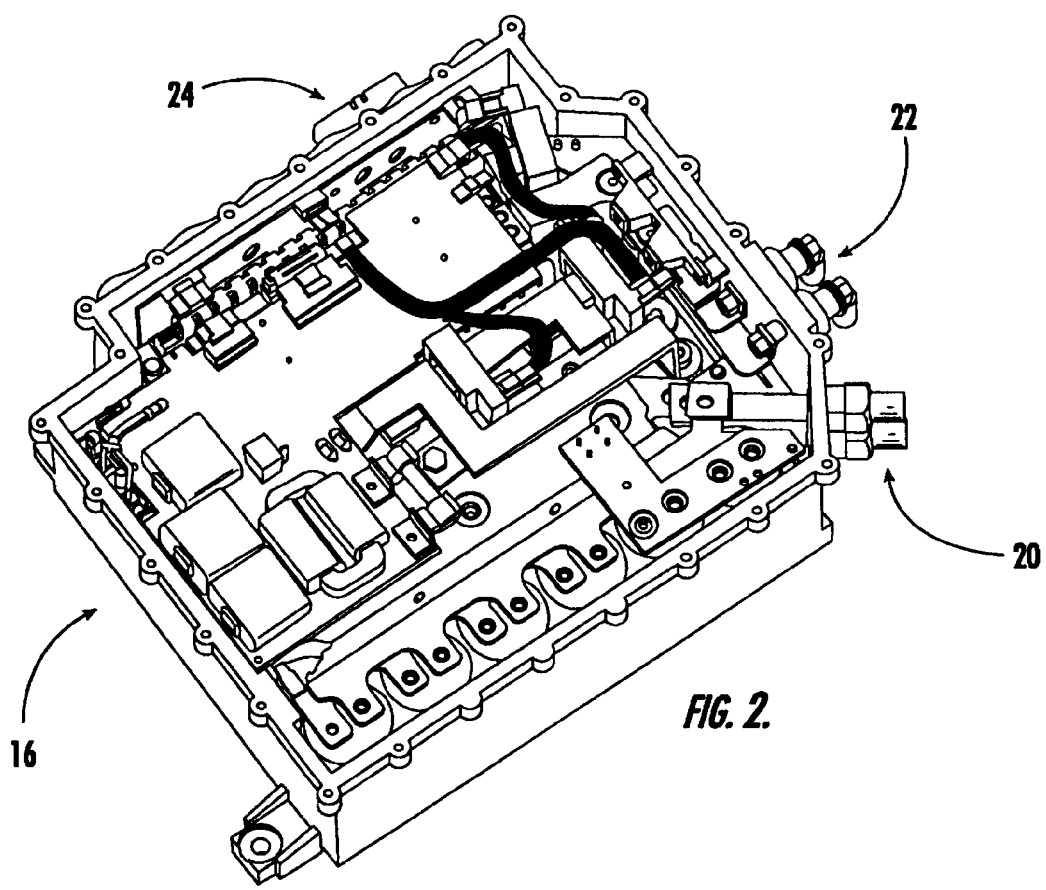
FIG. 2 is another perspective view of one embodiment of the integrated power system of the present invention, highlighting the electric vehicle power and communications connections.

Referring to FIG. 2, in one embodiment, the common casting 16 of the present invention incorporates an incoming power supply 20 from the high-voltage battery pack or fuel cell, an outgoing power supply 22 to the accessory/auxiliary battery through the DC/DC converter 14 (FIG. 1), and a communications link 24 with the other components and assemblies of the electric vehicle.

Figure 3:
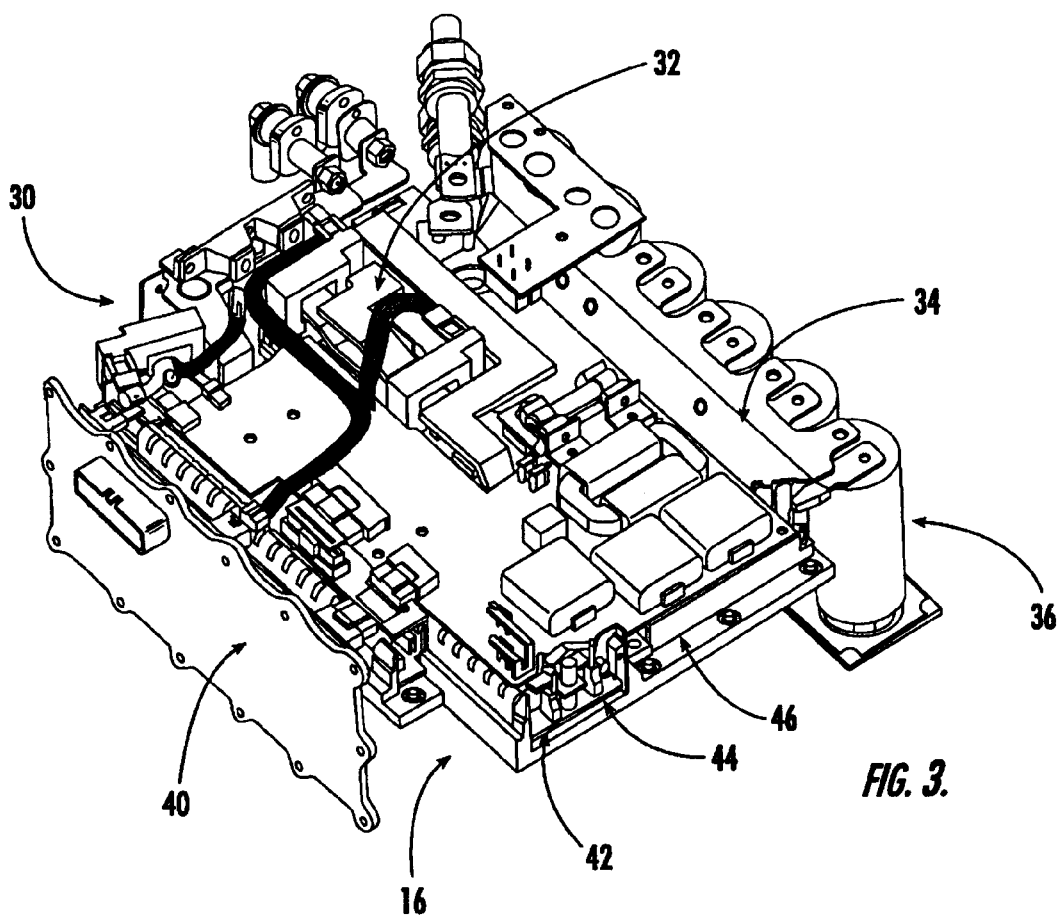
FIG. 3 is a further perspective view of one embodiment of the integrated power system of the present invention, highlighting the common TIM and DC/DC converter components.

Referring to FIG. 3, in one embodiment, the common casting 16 of the present invention also integrates the TIM electronics and the DC/DC converter electronics. Common DC/DC low-voltage busbars 30, three-phase busbars 32, and high-voltage busbars 34 are used to route incoming power to the TIM 12 (FIG. 1) and the DC/DC converter 14 (FIG. 1), and to route outgoing power to the motor. Common connectors are used to connect the TIM 12 and the DC/DC converter 14 to other components and assemblies of the electric vehicle. For example, DC-side high-voltage capacitors 36 and low-voltage capacitors 38 (FIG. 4) utilized by both the TIM 12 and the DC/DC converter 14 are shared.

Figure 4:
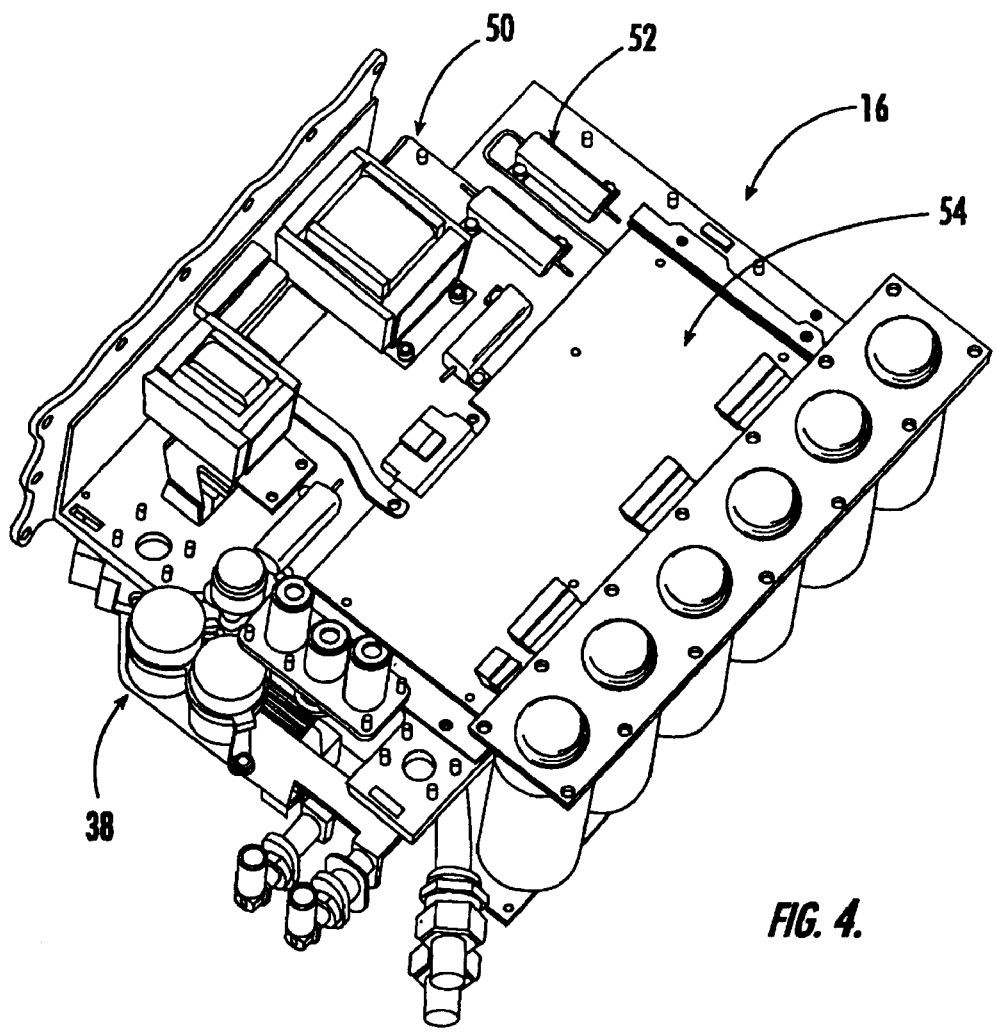
FIG. 4 is a final perspective view of one embodiment of the integrated power system of the present invention, highlighting additional TIM and DC/DC converter components.

Referring to FIGS. 3 and 4, in one embodiment, other components disposed with the common casting 16 of the present invention include an inverter control board 40, a DC/DC driver and control board 42, a DC/DC power board 44, power modules for the TIM 46, DC/DC magnetics (including transformers and inductors) 50, a discharge resistor assembly 52, and a TIM gate driver 54.

Integration of the TIM 12 (FIG. 1) and the DC/DC converter 14 (FIG. 1) reduces their overall volume, weight, and complexity. Specifically, the integrated power system 10 (FIG. 1) allows the TIM 12, which is typically positioned in the front of an electric vehicle, and the DC/DC converter 14, which is typically positioned in the rear of an electric vehicle, to be positioned in close proximity to each other.

Although the present invention has been described with reference to preferred embodiments and examples, other embodiments may achieve the same results. Variations in and modifications to the present invention will be apparent to those skilled in the art and the following claims are intended to cover all such equivalents.

Claims:

1. An integrated power system for use in an electric vehicle having a fuel cell and an electric motor, the integrated power system comprising:
   a common casting;
   a traction inverter module operable for converting DC current generated by the fuel cell into AC current capable of powering the electric motor, the traction inverter module disposed within the common casting; and
   a DC/DC converter operable for stepping-down the voltage of the fuel cell, the DC/DC converter disposed within the common casting.

2. The integrated power system of claim 1, further comprising a common busbar operable for routing incoming power to both the traction inverter module and the DC/DC converter.

3. The integrated power system of claim 1, further comprising a common coldplate operable for cooling the components of both the traction inverter module and the DC/DC converter.

4. The integrated power system of claim 1, further comprising a plurality of common connectors operable for connecting both the traction inverter module and the DC/DC converter to other components of the electric vehicle.

5. An electric vehicle having a fuel cell and an electric motor, the electric vehicle comprising:
   an integrated power system, comprising:
     a common casting;
     a traction inverter module operable for converting DC current generated by the fuel cell into AC current capable of powering the electric motor, the traction inverter module disposed within the common casting; and
     a DC/DC converter operable for stepping-down the voltage of the fuel cell, the DC/DC converter disposed within the common casting.

6. The electric vehicle of claim 5, wherein the integrated power system further comprises a common busbar operable for routing incoming power to both the traction inverter module and the DC/DC converter.

7. The electric vehicle of claim 5, wherein the integrated power system further comprises a common coldplate operable for cooling the components of both the traction inverter module and the DC/DC converter.

8. The electric vehicle of claim 5, wherein the integrated power system further comprises a plurality of common connectors operable for connecting both the traction inverter module and the DC/DC converter to other components of the electric vehicle.

9. An integrated power method for use in an electric vehicle having a fuel cell and an electric motor, the integrated power method comprising:
   providing a common casting;
   providing a traction inverter module operable for converting DC current generated by the fuel cell into AC current capable of powering the electric motor;
   providing a DC/DC converter operable for stepping-down the voltage of the fuel cell; and
   disposing the traction inverter module and the DC/DC converter within the common casting.

10. The integrated power method of claim 9, further comprising providing a common busbar operable for routing incoming power to both the traction inverter module and the DC/DC converter.

11. The integrated power method of claim 9, further comprising providing a common coldplate operable for cooling the components of both the traction inverter module and the DC/DC converter.

12. The integrated power method of claim 9, further comprising providing a plurality of common connectors operable for connecting both the traction inverter module and the DC/DC converter to other components of the electric vehicle.

* * * * *